United States Patent
Ando et al.

(10) Patent No.: US 8,765,325 B2
(45) Date of Patent: Jul. 1, 2014

(54) SOLID OXIDE FUEL CELL AND METHOD FOR PRODUCING THE SAME

(71) Applicant: Toto Ltd., Kitakyushu (JP)

(72) Inventors: Shigeru Ando, Odawara (JP); Seiki Furuya, Fujisawa (JP); Yutaka Momiyama, Yokohama (JP); Kiyoshi Hayama, Fujisawa (JP); Osamu Okamoto, Chigasaki (JP); Naoki Watanabe, Chigasaki (JP); Nobuo Isaka, Yokohama (JP); Masaki Sato, Fujisawa (JP)

(73) Assignee: Toto Ltd., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 14/026,430

(22) Filed: Sep. 13, 2013

(65) Prior Publication Data
US 2014/0080033 A1    Mar. 20, 2014

(30) Foreign Application Priority Data

Sep. 14, 2012  (JP) ................................ 2012-203132
Aug. 29, 2013  (JP) ................................ 2013-178373

(51) Int. Cl.
*H01M 8/10* (2006.01)
*H01M 8/02* (2006.01)
*H01M 8/00* (2006.01)
*H01M 8/12* (2006.01)

(52) U.S. Cl.
CPC ............ *H01M 8/023* (2013.01); *H01M 8/0236* (2013.01); *H01M 8/004* (2013.01); *H01M 2008/1293* (2013.01)
USPC ......................................................... 429/482

(58) Field of Classification Search
None
See application file for complete search history.

(56) References Cited

U.S. PATENT DOCUMENTS

| 6,844,098 B1 | 1/2005 | Ishihara et al. |
| 7,033,690 B1 | 4/2006 | Akikusa et al. |
| 2004/0121217 A1 | 6/2004 | Herman et al. |

FOREIGN PATENT DOCUMENTS

| JP | 11-335164 A | 12/1999 |
| JP | 2002-015756 A | 1/2002 |
| JP | 2005-093241 A | 4/2005 |
| WO | WO 2013/026647 A1 | 2/2013 |

OTHER PUBLICATIONS

Extended European Search Report in corresponding European Application No. 13 18 4604.0, dated Jan. 27, 2014, 5 pages.

*Primary Examiner* — Patrick Ryan
*Assistant Examiner* — Wyatt McConnell
(74) *Attorney, Agent, or Firm* — Brinks Gilson & Lione; G. Peter Nichols (57) ABSTRACT

An object of the present invention is to provide a fuel cell preventing formation of a diffusion layer containing Ca and other elements, and having an excellent power generation performance at low temperature by preventing breakdown of a crystal structure of an electrolyte by firing. Disclosed is a solid oxide fuel cell which includes an inner electrode, a solid electrolyte, and an outer electrode, each sequentially laminated on the surface of a porous support. The porous support contains forsterite, and has a Ca element content of 0.2 mass % or less in terms of CaO in a surface region at the inner electrode side.

12 Claims, 9 Drawing Sheets

SOLID OXIDE FUEL CELL AND METHOD FOR PRODUCING THE SAME

RELATED APPLICATIONS

This application claims priority under 35 U.S.C. §119 to Japanese Patent Application Nos. 2012-203132 filed on Sep. 14, 2012 and 2013-178373 filed on Aug. 29, 2013.

TECHNICAL FIELD

The present invention relates to a solid oxide fuel cell and a method for producing the same.

BACKGROUND ART

In recent years, intense studies have been conducted on low operating-temperature solid oxide fuel cells to reduce operating temperatures of solid oxide fuel cells to around 600° C. to 800° C. As a solid electrolyte material for low operating-temperature solid oxide fuel cells, lanthanum-gallate-based oxide have been proposed (see, for example, Japanese Patent Application Publication No. 2002-15756 (pages 1 to 9, FIGS. 1 to 9), and Japanese Patent Application Publication No. Hei 11-335164 (pages 1 to 12, FIGS. 1 to 12)). In solid oxide fuel cells in which lanthanum-gallate-based oxide is used as a solid electrolyte material, NiO—YSZ having similar thermal expansion properties is employed as support material. Nevertheless, NiO—YSZ is expensive, and hence an inexpensive support material is desired. In this regard, the use of relatively inexpensive forsterite-based sintered compact as a support material has been proposed (see Japanese Patent Application Publication No, 2005-93241).

CITATION LIST

Patent Literature

[Patent Literature 1] Japanese Patent Application Publication No. 2002-15756
[Patent Literature 2] Japanese Patent Application Publication. No. Hei 11-335164
[Patent Literature 3] Japanese Patent Application Publication No. 2005-93241

SUMMARY OF THE INVENTION

Technical Problems

However, the followings have been found out. Specifically, when, forsterite and lanthanum-gallate-based oxide are used respectively as a porous support material and a solid electrolyte material to prepare a solid oxide fool cell in which an inner electrode, the solid electrolyte, and an outer electrode are sequentially laminated on a surface of the porous support, the fuel cell cannot generate electrical power. The examination on the cause of this problem has revealed that Ca in the forsterite raw material used as the porous support material is moved out of the porous support by firing, and combines with other elements moved from layers other man the porous support, thereby forming a diffusion layer between the porous support and the inner electrode. It has been also revealed that the crystal structure of the lanthanum-gallate-based oxide is not maintained after the firing. The cause is presumably that a dopant Sr contained in the lanthanum-gallate-based oxide is readily separated from the crystal by Ca moved from the porous support, and forms the diffusion layer together with Ca, and as Sr is separated, the lanthanum-gallate-based oxide cannot maintain the crystal structure.

Solution to Problems

The present, inventors who have discovered the aforementioned phenomena have found that commercially-available forsterite raw materials generally contain CaO as impurities. In addition, the inventors have found that reducing the content of CaO present as the impurities can suppress the phenomena. The present invention has been made based on these findings. Specifically, the present invention relates to a solid oxide fuel cell comprising an inner electrode, a solid electrolyte, and an outer electrode, each of which is sequentially laminated on a surface of a porous support. The porous support contains forsterite, and has a Ca element content of 0.2 mass % or less in terms of CaO in a surface region at the inner electrode side. Ca contained in the porous support is moved out of the porous support by firing, and combines with other elements moved from other layers, thereby forming a diffusion layer between the porous support and the inner electrode. Reducing the amount of Ca in the porous support prevents formation of the diffusion layer containing Ca and the other elements. Moreover, it is possible to maintain the crystal, structure of the solid electrolyte layer even after the firing.

The present invention is more effective when the solid electrolyte contains lanthanum-gallate-based oxide doped with Sr and Mg. The dopant Sr contained in the lanthanum-gallate-based oxide is readily separated from the crystal by Ca contained in the porous support, and forms a diffusion layer together with Ca. Thus, when, the solid electrolyte contains the lanthanum-gallate-based oxide doped with Sr and Mg, it is important to reduce the amount of Ca contained in the porous support in order to maintain the crystal structure of the lanthanum-gallate-based oxide after the firing.

Moreover, the solid electrolyte is preferably represented by the general formula $La_{1-a}Sr_aGa_{1-b-c}Mg_bCo_cO_3$, where $0.05 \leq a \leq 0.3$, $0 < b < 0.3$, and $0 \leq c \leq 0.15$. This enables a high power generation performance at low temperature. A simple way in the present invention of reducing the amount of Ca contained in the porous support makes it possible to obtain a fired product maintaining an ideal blending ratio for ensuring the performance of the electrolyte.

In the present invention, the porous support preferably has a Ca element content of 0.2 mass % or less in terms of CaO. Reducing the Ca element content not only in the surface region but also in the entire porous support can further prevent formation of the diffusion layer containing Ca and the other elements.

Further, the present invention relates to a method for producing a solid oxide fuel cell including an inner electrode, a solid electrolyte, and an outer electrode, each of which is sequentially laminated on a surface of a porous support, the method including forming the porous support by firing a compact having a Ca element content of 0.2 mass % or less in terms of CaO and further containing forsterite. Moreover, the compact preferably includes at least two layers, each having different Ca element contents, and one of the layers at the inner electrode side has a Ca element content of 0.2 mass % or less in terms of CaO. This enables general-use materials containing a relatively high concentration of Ca to be used for a lower portion of the porous support, making it possible to provide the cell at a low cost. Furthermore, this enables the Ca concentration to have a gradation, and hence this can prevent the diffusion of Ca out of the porous support during the firing.

Advantageous Effects of Invention

The present invention makes it possible to prevent a diffusion layer from being formed, wherein the diffusion layer contains Ca that diffuses into the diffusion layer from a porous support during firing and other elements. Moreover, it is possible to provide a fuel cell having an excellent power generation performance at low temperature by preventing breakdown of a crystal structure of an electrolyte by firing.

DETAILED DESCRIPTION OF THE PREFERRED EMBODIMENTS

A solid oxide fuel cell of the present invention includes an inner electrode, a solid electrolyte, and an outer electrode sequentially laminated on the surface of a porous support. The fuel cell of the present invention is not limited to have particular shapes. The fuel cell may have for example a cylindrical shape, a planar shape, a hollow planar shape in which multiple gas flow paths are formed, or other similar shapes. Since the porous support of the fuel cell of the present invention is an insulating support, horizontal stripe type cells are preferable in which multiple power-generating elements are formed in series on one porous support. Here, the power-generating, elements mean, a laminate having an inner electrode (fuel electrode or air electrode), a solid electrolyte, and an outer electrode (air electrode or fuel electrode), each of which is sequentially laminated.

In the fuel cell, of the present invention, the porous support contains forsterite. The porous support is a sintered compact containing forsterite ($Mg_2SiO_4$) crystals, crystalline and/or amorphous MgO, crystalline and/or amorphous $SiO_2$, and other glassy materials and impurities. In the fuel cell of the present invention, the porous support preferably contains a Mg element and a Si element in total of 90 mass %, preferably 95 mass %, more preferably 98 mass % or more in terms of MgO and $SiO_2$. In the fuel cell of the present invention, it is more preferable that the porous support has a sum of peak intensities of first diffraction lines (i.e., diffraction lines having the highest intensity) of crystal components other than forsterite crystal of 5 or less, wherein the peak intensity of a first diffraction line of the forsterite crystal obtained by X-ray diffraction is 100.

Preferably, the porous support consists essentially of forsterite (i.e., mainly formed from forsterite). The porous support has a Ca element content of 0.2 mass % or less, preferably 0.1 mass % or less, more preferably 0.06 mass % or less, in terms of CaO in the surface region at the power-generating elements side, and does not necessarily have to contain a Ca element. Herein, the "surface region" means a region that covers a depth of approximately 100 μm from the surface. The Ca content in such a surface region can be measured, for example, by XRF. The XRF measurement sample is prepared as follows. Specifically, the laminated surface of the fuel cell is mechanically striped, and the surface of the exposed porous support is mechanically ground up to the depth of approximately 100 μm to obtain the sample of XRF. Moreover, when the sample is quantified by XRF, JCRM R 901 talc powder which is a certified reference material by the Ceramic Society of Japan is used to create a one point calibration curve for the XRF.

The Ca element concentration distribution in the porous support may be uniform, or may have a gradation toward the surface of the porous support at the power-generating elements side. Alternatively, the porous support may be a laminate having at least two layers, each having different Ca element contents. When the porous support has a gradation of Ca element concentration distribution toward the surface of the porous support at the power-generating elements side, or when the porous support is a laminate having two or layers, the Ca element content in regions other than the surface region at the power-generating elements side, may exceed 0.2 mass %. The porous support is obtained by preparing a compact having a Ca element content within a predetermined range, and then firing the compact. The porous support is preferably obtained by preparing a compact by mixing a raw material containing Ca element, the concentration of which is higher than the above-described range, and forsterite with a raw material containing Ca element, the concentration of which is lower than the above-described range, and forsterite so that the compact can have a Ca element content within the predetermined range, and then firing the compact.

In the fuel cell of the present invention, the inner electrode may be a fuel electrode or an air electrode. In the fuel cell (cylindrical cell, hollow planar cell, or the like) including the gas flow paths within the porous support, the inner electrode is preferably a fuel electrode. When the inner electrode is a fuel electrode, the outer electrode is an air electrode.

The fuel electrode may be made of NiO/zirconium-containing oxide, NiO/cerium-containing oxide, or the like. Here, the NiO/zirconium-containing oxide means one obtained by uniformly mixing NiO with a zirconium-containing oxide in a predetermined ratio. The NiO/cerium-containing oxide means one obtained by uniformly mixing NiO with a cerium-containing oxide in a predetermined ratio. The zirconium-containing oxide in the NiO/zirconium-containing oxide includes zirconium-containing oxides doped with one or more of CaO, $Y_2O_3$, and $Sc_2O_3$, and the like. The cerium-containing oxide in die NiO/cerium-containing oxide includes ones represented by the general formula $Ce_{1-y}Ln_yO_2$, where Ln is any one of or a combination of two or more of La, Pr, Nd, Sm, En, Gd, Tb, Dy, Ho, Br, Tm, Yb, Lu, Sc and Y, $0.05 \leq y \leq 0.50$. Note that since NiO is reduced under a fuel atmosphere and turned into Ni, the mixture becomes Ni/zirconium-containing oxide or Ni/cerium-containing oxide. The fuel electrode may be composed of a single layer or multiple layers. In the case where the fuel electrode as the inner electrode includes multiple layers, Ni/YSZ (yttria-stabilized zirconia) is used for a layer at the porous support side while Ni/GDC ($Gd_2O_3$—$CeO_2$) (=fuel electrode catalyst layer) is used for a layer at the electrolyte side.

The air electrode may be made of a lanthanum-cobalt-based oxide such as $La_{1-x}Sr_xCoO_3$ (where x=0.1 to 0.3) or $LaCo_{1-x}Ni_xO_3$ (where x=0.1 to 0.6), a lanthanum-ferrite-based oxide ($La_{1-m}Sr_mCo_{1-n}Fe_nO_3$ (where $0.05<m<0.50$, $0<n<1$)) which is a solid solution of (La,Sr)FeO and (La,Sr)$CoO_3$, or the like. The air electrode may be composed of a single layer or multiple layers. In the case where the air electrodes as the outer electrode includes multiple layers. $La_{0.6}Sr_{0.4}Co_{0.2}Fe_{0.8}O_3$ (=air electrode catalyst layer) is used for a layer at the electrolyte side while $La_{0.6}Sr_{0.4}Co_{0.8}Fe_{0.2}O_3$ (=air electrode) is used for the outermost layer.

In the fuel cell of the present invention, the solid electrolyte may be made of lanthanum-gallate-based oxide, stabilized zirconia doped with one or more of Y, Ca, and Sc. The solid electrolyte includes preferably lanthanum-gallate-based oxide doped with Sr and Mg, more preferably lanthanum-gallate-based oxide (LSGM) represented by the general formula $La_{1-a}Sr_aGa_{1-b-c}Mg_bCo_cO_3$, where $0.05 \leq a \leq 0.3$, $0<b<0.3$, and $0 \leq c \leq 0.15$. A layer of the solid electrode may be provided at the fuel electrode side as a reaction prevention layer that includes ceria doped with La ($Ce_{1-x}La_xO_2$ (where $0.3<x<0.5$)). The reaction prevention layer is preferably made of $Ce_{0.6}La_{0.4}O_2$. The solid electrolyte may be composed of a single layer or multiple layers. In the ease where the solid electrolyte includes multiple layers, a reaction prevention layer such as $Ce_{0.6}La_{0.4}O_2$ is used between the fuel electrode and a layer of the solid electrolyte made of LSGM.

Figure 1:
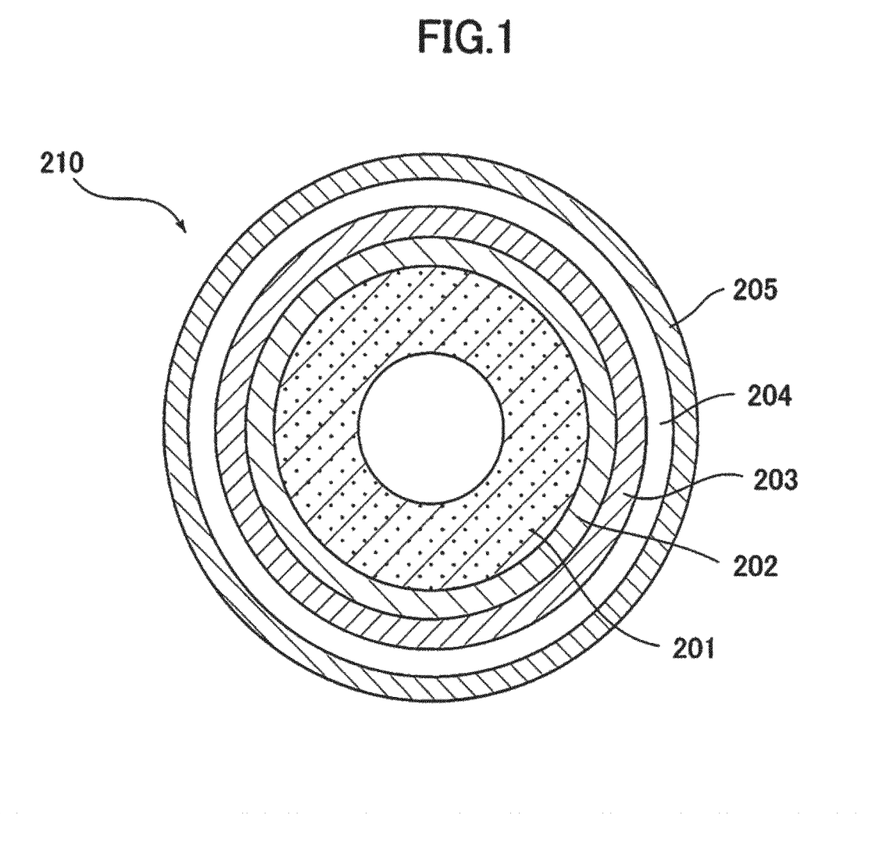
FIG. 1 is a schematic view showing one aspect of a cross section of a solid oxide fuel cell of the present invention.

FIG. 1 is a schematic view showing one aspect of a cross section of the solid oxide fuel cell, of the present invention, and shows a type in which the inner electrode is a fuel electrode. A solid oxide fuel cell 210 of the present invention includes, for example, a porous support 201, a (first/second) fuel electrode 202, a (first/second) solid electrolyte 203, a (first/second) air electrode 204, and a current collecting layer 205. In the solid oxide fuel cell of the present invention, the thickness of each layer is preferably: 0.5 to 2 mm for the porous support, 10 to 200 μm for the fuel electrode, 0 to 30 μm for the fuel electrode catalyst layer, 0 to 20 μm for the reaction prevention layer, 5 to 60 μm for the solid electrolyte, 0 to 30 μm for the air electrode catalyst layer, and 10 to 0.200 μm for the air electrode. Here, (first/second) means "being a single layer or two layers, and in the case of two layers, having a first layer and a second layer."

A method for producing the solid oxide fuel cell of the present invention is not particularly limited. The solid oxide fuel cell of the present invention can be produced, for example, as follows.

A solvent (such as water or alcohol) is added to a raw-material powder containing forsterite to prepare a green body. In this event, an optional component such as a dispersant, a binder, an anti-foaming agent, or a pore-forming agent may be added. The green body thus prepared is molded, dried, and then pre-fired (800° C. or higher but lower than 1100° C.) to obtain a porous support. For molding the green body, a sheet molding method, a press molding method, an extrusion method, or the like is employed, in the case of a porous support in which gas flow paths are formed, an extrusion method is preferable. When the porous support forming multiple layers is molded, in addition to a method of "multilayer extrusion" in which the multiple layers are integrally extruded, a method in which the upper layer is formed by coating or printing can also be employed. The coating method include a slurry coating method in which a raw material slurry is applied, a tape casting method, a doctor blade casting method, a transferring method, and the like. The printing method, includes a screen printing method, an inkjet method, and the like.

The inner electrode, the solid electrolyte, and the outer electrode can be obtained as follows. Specifically, to each raw-material powder, a solvent (such as water or alcohol) and a molding additive such as a dispersant or a binder are added to prepare a slurry. The slurry is applied, dried, and then fired (1100° C. or higher but lower than 1400° C.). The slurry can be applied by the same method that can be employed for the coating with the upper layer of the porous support including multiple layers. The bring may be performed every time each layer of the electrodes and solid electrolyte is formed, but "co-firing" in which the multiple layers are tired at once is preferably performed, in addition, in order not to degrade the electrolyte by the diffusion of the dopant or the like, the firing is preferably performed in an oxidizing atmosphere. More preferably, a gas mixture of air+oxygen is used, and the firing is performed in such an atmosphere that the oxygen concentration is 20 mass % to 30 mass % both inclusive. When a fuel electrode is used as the inner electrode and an air electrode is used as the outer electrode, it is preferable that the fuel electrode and the electrolyte be co-fired, and then the air electrode be formed and fired at a temperature lower than, the co-firing.

Figure 2:
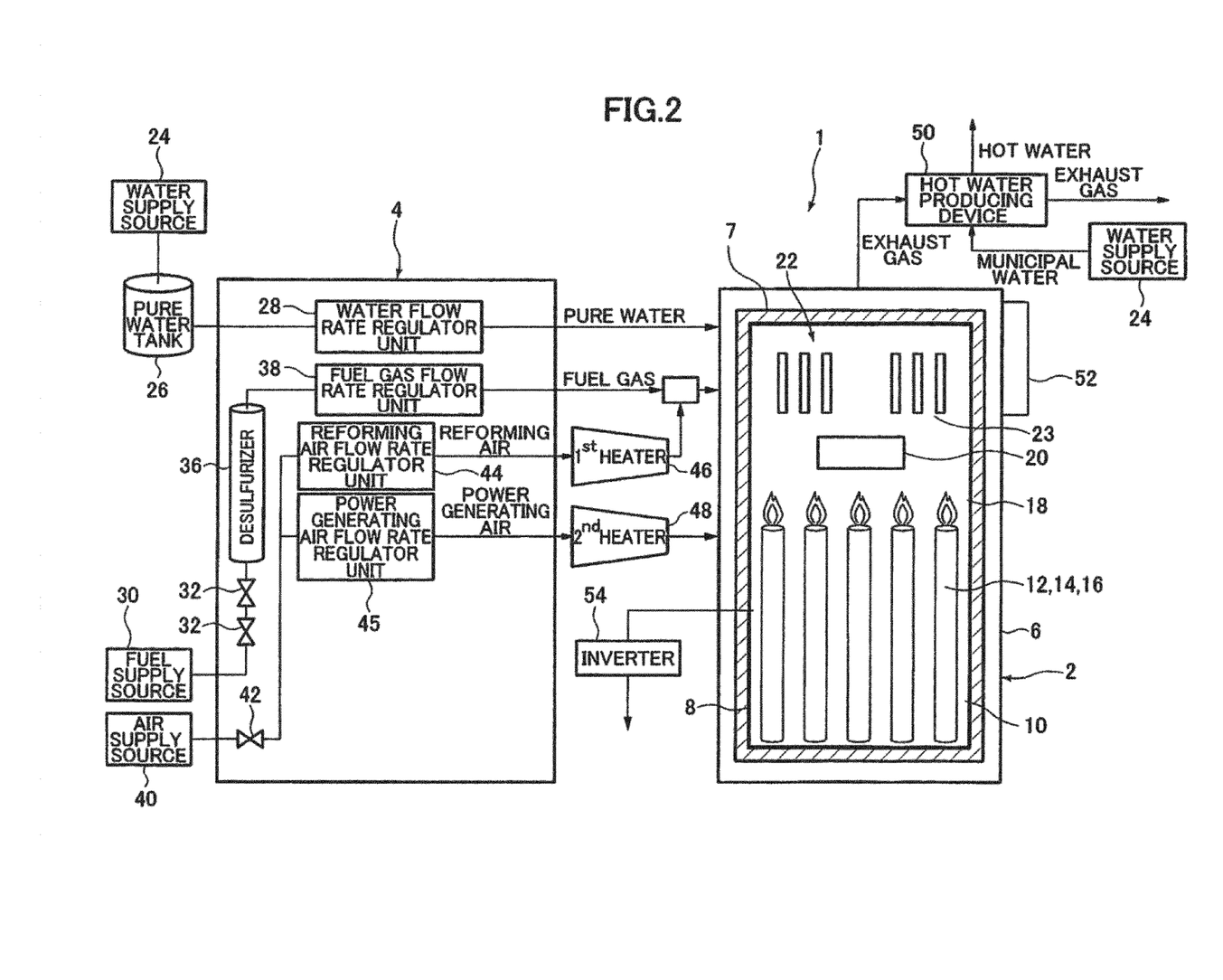
FIG. 2 is an over view diagram showing a solid oxide fuel cell system.

A solid oxide fuel cell system using the solid oxide fuel cell of the present invention is not limited to have particular structures. The production thereof other materials, and the like may be publicly-known ones. FIG. 2 is an overview diagram showing a solid oxide fuel cell system according to one embodiment of the present invention. As shown in FIG. 2, a solid oxide fuel cell system 1 includes a fuel cell module 2 and an auxiliary unit 4.

The fuel cell module 2 includes a housing 6. The housing 6 with an insulating material 7 has a sealed space 8 therein. Note that it is acceptable not to provide the insulating material. A fuel cell assembly 12 for carrying out the power-generating reaction, using fuel gas and oxidizer (air) is disposed in a power-generating chamber 10, which is the lower part of this sealed space 8. This fuel cell assembly 12 is furnished with ten fuel cell stacks 14 (see FIG. 4); the fuel cell stack 14 includes 16 fuel cell units 16 (see FIG. 5). Thus, the fuel cell assembly 12 has 160 fuel cell units 16, all of which are serially connected.

In the sealed space 8 of the fuel cell module 2, a combustion chamber 18 is formed above the aforementioned power-generating chamber 10. In the combustion chamber 18, residual fuel gas and residual oxidizer (air) not used in the power-generating reaction are combusted to produce exhaust gas. Above the combustion, chamber 18, a reformer 20 for reforming fuel gas is disposed. The reformer 20 is heated by the heat of combustion of the residual gas to a temperature at which reforming reaction can take place. Above the reformer 20, an air heat exchanger 22 is disposed, which receives the heat of the reformer 20 to heat air and which reduces a decrease in the temperature of the reformer 20.

Next, the auxiliary unit 4 includes a pure water tank 26 for holding water from a water supply source 24 such as waterworks and filtering the water into pure water, and a water flow rate regulator unit 28 for regulating the flow rate of water supplied from, the reservoir tank. The auxiliary unit 4 further includes a gas shutoff valve 32 for shutting off fuel gas such as municipal gas supplied from a fuel supply source 30, a desulfurizer 36 for desulfurizing the fuel gas, and a fuel gas flow rate regulator unit 38 for regulating the flow rate of the fuel gas. Furthermore, the auxiliary unit 4 includes an electromagnetic valve 42 for shutting off air as an oxidant supplied from an air supply source 40, a reforming air flow rate regulator unit 44 and a power-generating air flow rate regulator unit 45 for regulating the flow rate of air, a first heater 46 for heating reforming air supplied to the reformer 20, and a second heater 48 for heating power-generating air supplied to the power-generating chamber. The first and second heaters 46 and 48 are provided to efficiently raise temperature at startup, but may be omitted.

Next, the fuel cell module 2 is connected to a hot-water producing device 50. The hot-wafer producing device 50 is supplied with exhaust gas. The hot-water producing device 50 is supplied with municipal water from the water supply source 24. This municipal water is turned into hot water by the heat of the exhaust gas and supplied to a hot water reservoir tank in an unillustrated external water heater. Moreover, the fuel cell module 2 is provided with a control box 52 for controlling the supply flow rate of the fuel gas and the like. Further, the fuel cell module 2 is connected to an inverter 54. The inverter 54 serves as an electrical power extraction unit (electrical power conversion unit) for supplying electrical power generated by the fuel cell module to the outside.

Figure 3:
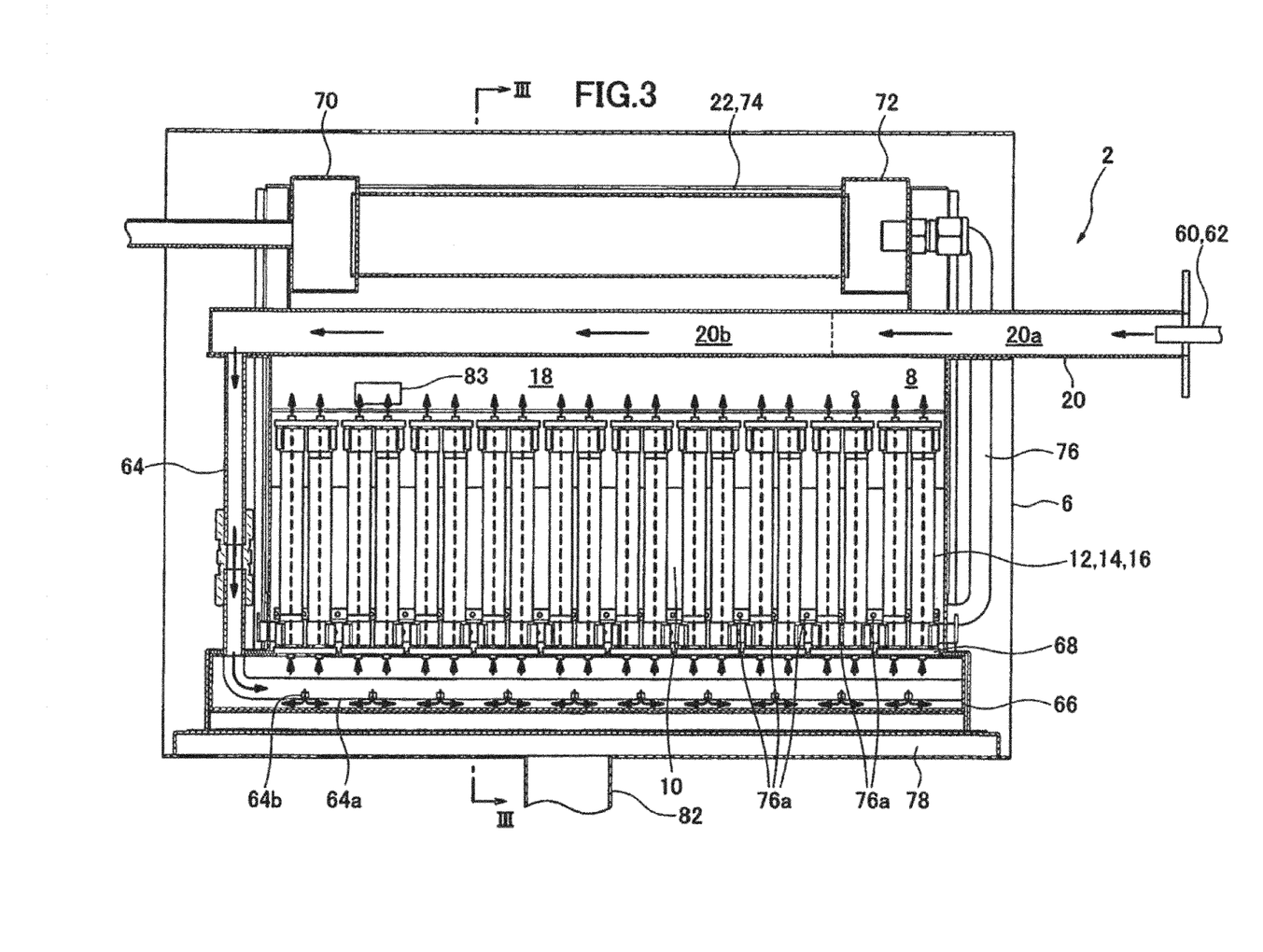
FIG. 3 is a side elevation cross section showing a fuel cell module in the solid oxide feel cell system.
Figure 6:
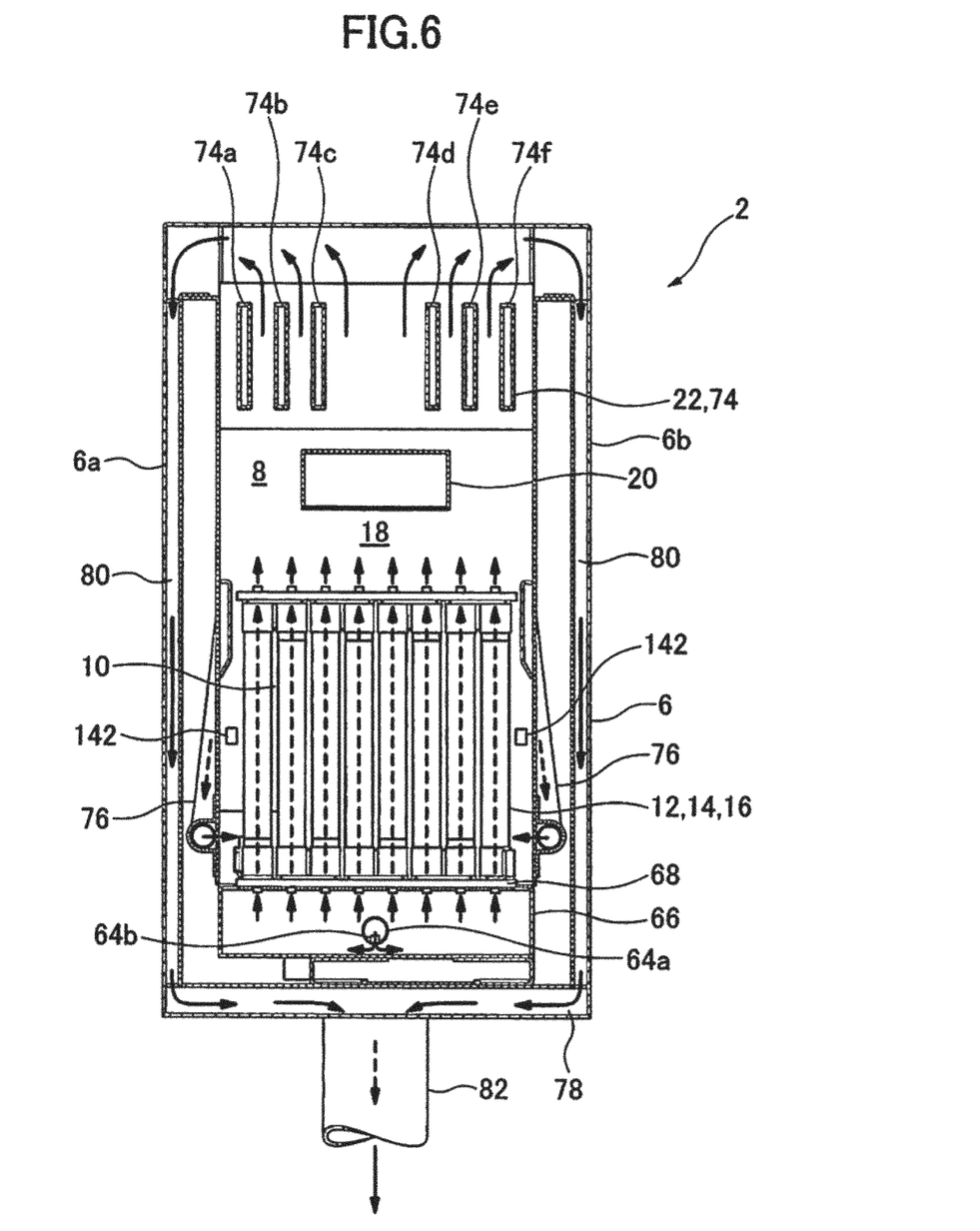
FIG. 6 is a cross section taken along line III-III in FIG. 3.

Next, with reference to FIGS. 3 and 6, a description will be made of the internal structure of the fuel cell module of the solid oxide fuel cell system. FIG. 3 is a side elevation cross section showing the fuel cell module of the solid oxide fuel cell system. FIG. 6 is a cross section taken along line III-III in FIG. 3. As shown in FIGS. 3 and 6, the fuel, cell assembly 12, the reformer 20, and the air heat exchanger 22 are arranged in sequence starting from, the bottom in the sealed space 8 within the housing 6 of the fuel cell module 2 as described above.

A pure water guide pipe 60 for introducing pure water and a reformed gas guide pipe 62 for introducing foci gas to be reformed and reforming air are attached to an upstream end of the reformer 20. Within the reformer 20, a vaporizing section 20a and a reforming section 20b are formed in sequence starting from the upstream side. The reforming section 20b is filled with a reforming catalyst. The fuel gas and air introduced into the reformer 20 and blended with water vapor are reformed by the reforming catalyst filled into the reformer 20.

A fuel gas supply pipe 64 is connected to a downstream end of the reformer 20. The fuel gas supply pipe 64 extends downward and further extends horizontally within a manifold 66 formed under the fuel cell assembly 12. Multiple fuel supply holes 64b are formed in a bottom surface of a horizontal portion 64a of the fuel gas supply pipe 64. Reformed fuel gas is supplied into the manifold 66 from the fuel supply holes 64b.

A lower support plate 68 having through holes for supporting the above-described fuel cell stacks 14 is attached to the top of the manifold 66, and fuel gas in the manifold 66 is supplied into the fuel cell unit 16.

Next, the air heat exchanger 22 is provided over the reformer 20. The air heat exchanger 22 includes an air concentration chamber 70 upstream of the exchanger and two air distribution chambers 72 downstream of the exchanger. The air concentration chamber 70 and the air distribution chambers 72 are connected through six air flow conduits 74. Here, as shown in FIG. 6, air in the air concentration chamber 70 flows from the two sets of the air flow conduits 74, each set having three air flow conduits 74 form a set (74a, 74b, 74c; 74d, 74e, 74f), into the respective air distribution chambers 72.

Air flowing in the six air flow conduits 74 of the air heat exchanger 22 is preheated by rising combustion exhaust, gas from the combustion chamber 18. An air guide pipe 76 is connected to each of the air distribution chambers 72. The air guide pipe 76 extends downward. The lower end of the air guide pipe 76 communicates with a lower space in the power-generating chamber 10 to introduce pre-heated air into the power-generating chamber 10.

Next, an exhaust gas chamber 78 is formed below the manifold 66. As shown in FIG. 6, exhaust gas conduits 80 extending in the vertical direction are formed on the insides of a front surface 6a and a rear surface 6b which form the faces in the longitudinal direction of the housing 6. Top ends of the exhaust gas chamber conduits 80 communicate with, a space in which the air heat exchanger 22 is disposed, and bottom ends thereof communicate with the exhaust gas chamber 78.

An exhaust gas discharge pipe 82 is connected, to nearly a central portion, of a bottom surface of the exhaust gas chamber 78. A downstream end of the exhaust gas discharge pipe 82 is connected to the aforementioned hot-water producing device 50 shown in FIG. 2. As shown in FIG. 3, an ignition device 83 for starting the combustion of fuel gas and air is provided in the combustion chamber 18.

Figure 4:
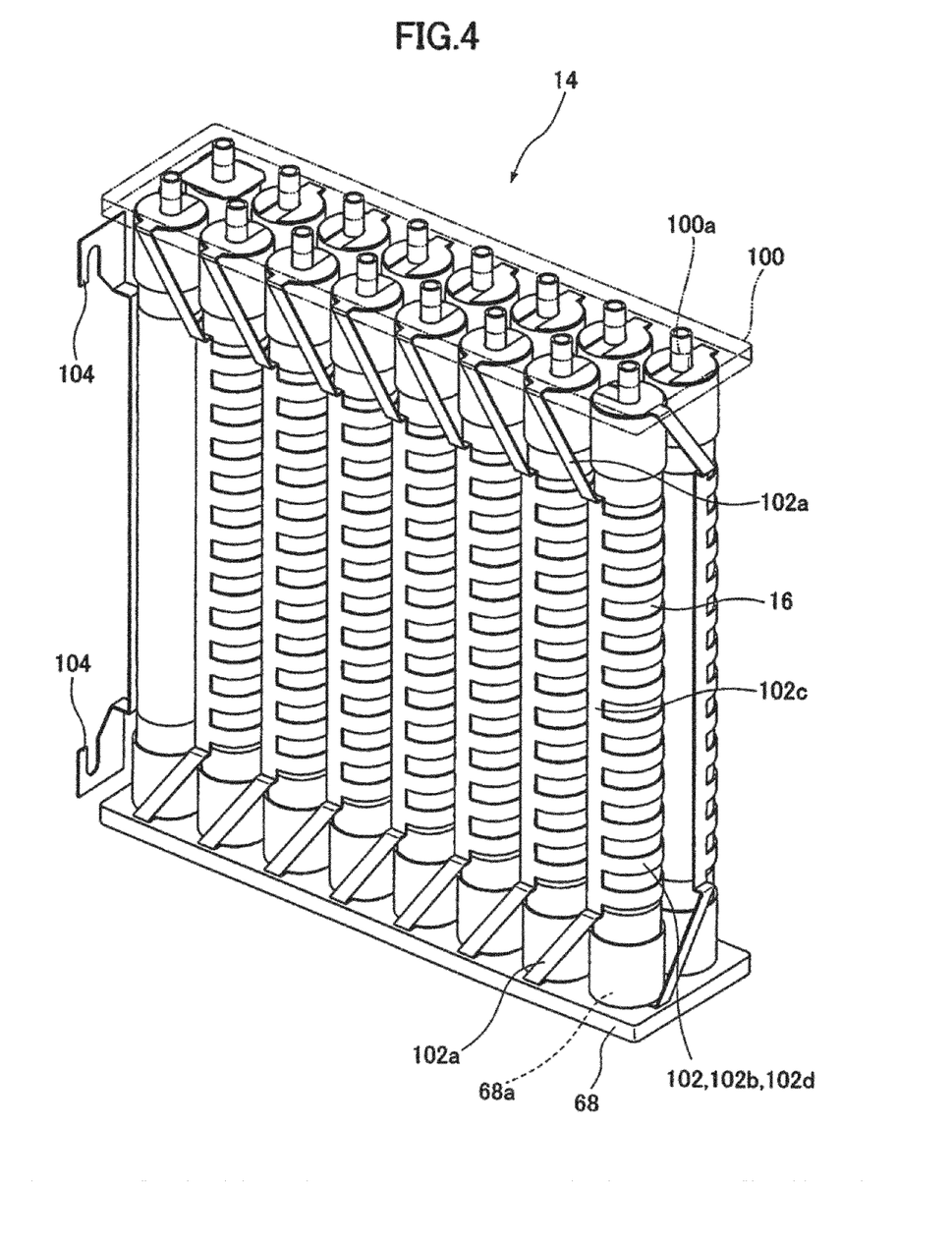
FIG. 4 is a perspective view showing a fuel, cell stack in the solid oxide fuel cell system.

Next, referring to FIG. 4, the fuel cell stack 14 will be described. FIG. 4 is a perspective view showing the fuel cell stack in the solid oxide fuel cell system. As shown in FIG. 4, the fuel cell stack 14 is furnished with 16 fuel cell units 16; the top and bottom, ends of these fuel cell units 16 are respectively supported by the lower support, plate 68 and an upper support plate 100, which are made of ceramic. Through holes 68a and 100a, through which inner electrode terminals 86 can penetrate, are provided on the lower support plate 68 and the upper support plate 100.

In addition, a current collector 102 and an external, terminal 104 are attached to the fuel cell unit 16. The current collector 102 is integrally formed by a fuel electrode connecting portion 102a, which is electrically connected to the inner electrode terminal 86 attached to an inner electrode layer 90 serving as the fuel electrode, and by an air electrode connecting portion 102b, which is electrically connected to the entire external perimeter of an outer electrode layer 92 serving as the air electrode. The air electrode connecting portion 102b is formed of a vertical portion 102c extending in the vertical direction along the surface of the outer electrode layer 92, and multiple horizontal portions 102d extending in the horizontal direction from the vertical portion 102c along the surface of the outer electrode layer 92. The fuel electrode connecting portion 102a extends linearly in an upward or downward diagonal direction from the vertical portion 102c of the air electrode connecting portion 102b toward the inner electrode terminals 86 positioned in the upper and lower directions on the fuel cell unit 16.

Furthermore, the inner electrode terminals 86 at the top and bottom ends of the two fuel cell units 16 positioned at the end of the fuel cell stack 14 (at the front and back sides on the left edge in FIG. 4) are respectively connected to the external terminals 104. These external terminals 104 are connected to other external terminals 104 (not shown) of the fuel cell units 16 at the ends of the adjacent fuel cell stack 14, and as described above, all of the 160 fuel cell units 16 are connected in series.

Figure 5:
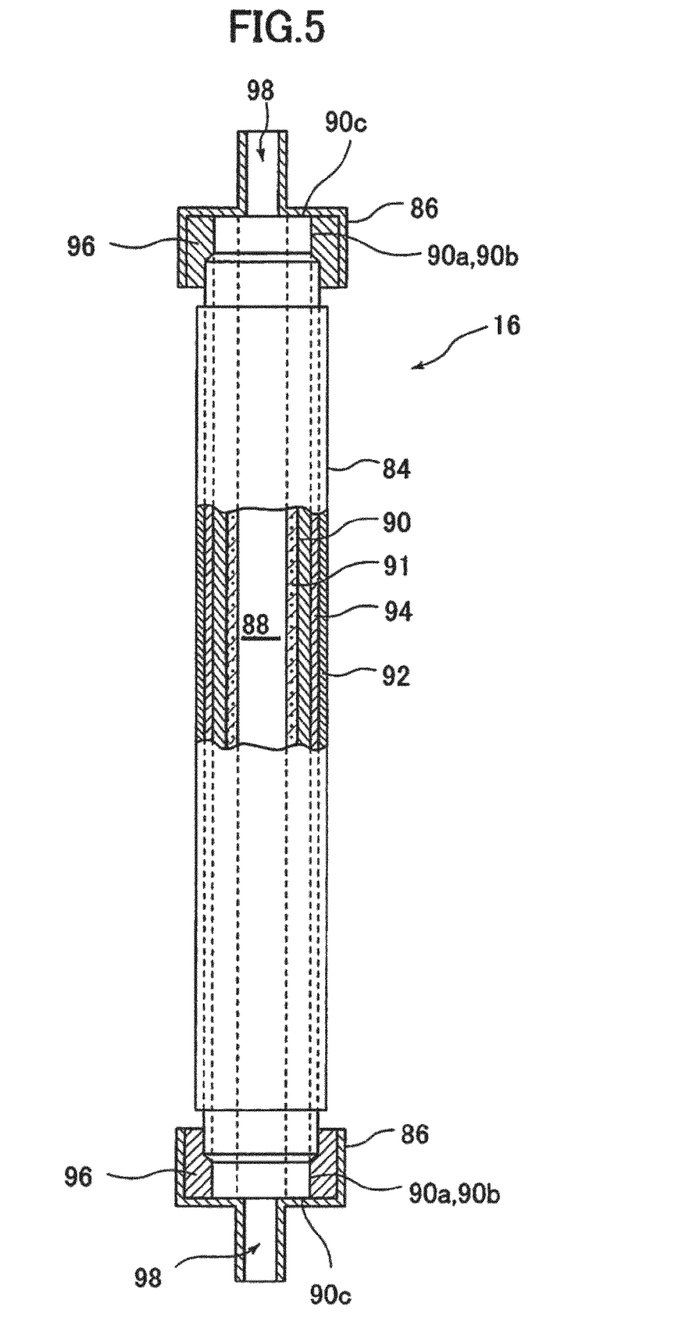
FIG. 5 is a partial cross section showing a fuel cell unit in the solid oxide fuel cell system.

Next referring to FIG. 5, the fuel cell unit 16 will be described. FIG. 5 is a partial cross section showing the fuel cell unit of the solid oxide fuel cell system. As shown in FIG. 5, the fuel cell unit 16 includes a fuel cell 84 and the inner electrode terminals 86 respectively connected to top and bottom ends of the fuel cell 84. The fuel cell 84 is a tubular structure extending in the vertical direction, and includes the inner electrode layer 90 on a cylindrical porous support 91 defining a fuel, gas flow path 88, the outer electrode layer 92, and an electrolyte layer 94 between the inner electrode layer 90 and the outer electrode layer 92.

Since the inner electrode terminals 86 attached to the top and bottom ends of the fuel cell 84 have the same structure, the inner electrode terminal 86 attached to the top end will be specifically described here. A top portion 90a of the inner electrode layer 90 includes an outside perimeter surface 90b and a top end surface 90c which are exposed to the electrolyte layer 94 and the outer electrode layer 92. The inner electrode terminal 86 is connected to the outside perimeter surface 90b of the inner electrode layer 90 through a conductive seal material 96, and connected directly to the top end surface 90c of the inner electrode layer 90 and thereby electrically connected to the inner electrode layer 90. A fuel gas flow path 98 communicating with the fuel gas flow path 88 of the inner electrode layer 90 is formed in a center portion of the inner electrode terminal 86. The fuel cell of the present invention is used as the fuel cell 84.

EXAMPLES

The present invention will be described in more details based on the following Examples. Note that the present invention is not limited to these Examples.

Example 1

Preparation of Green Body A for Porous Support

A high purity forsterite ($Mg_2SiO_4$ raw material containing 0.02 mass % CaO) powder was adjusted to have an average particle diameter of 0.7 μm. After 100 parts by weight of the powder was mixed with 20 parts by weight of a solvent (wafer), 8 parts by weight of a binder (methyl cellulose-based water-soluble polymer), and 15 parts by weight of a pore forming agent (acrylic resin particles having am average particle diameter of 5 μm) using a high-speed mixer, the mixture was kneaded with a kneader and deaerated with a vacuum kneader. Thus, a green body for extrusion was prepared. Here, the average particle diameter was measured according to JIS R 1629, and expressed in a 50% diameter (the same applies hereinafter).

(Preparation of Slurry for Fuel Electrode Layer)

A NiO powder and a 10YSZ (10 mol % $Y_2O_3$-90 mol % $ZrO_2$) powder were wet-mixed in a weight ratio of 65:35 to prepare a dry powder was obtained. The average particle diameter was adjusted to be 0.7 μm. Then, 40 parts by weight of the powder was mixed, with 100 parts by weight of a solvent (ethanol), 2 parts by weight of a binder (ethyl cellulose), and 1 part by weight of a dispersant (nonionic surfactant). After that, the resultant mixture was folly stirred to prepare a slurry. Note that "10 mol % $Y_2O_3$-90 mol % $ZrO_2$" means that the concentrations of a Y atom and a Zr atom, are respectively 10 mol % and 90 mol % based on a total amount of the Y atom and the Zr atom.

(Preparation of Slurry for Fuel Electrode Catalyst Layer)

A mixture of NiO and GDC 10(10 mol % $Gd_2O_3$-90 mol % $CeO_2$) was prepared by co-precipitation and then heat treated. Thus, a fuel electrode catalyst layer powder was obtained. The mixing ratio of NiO and GDC 10 was 50/50 by weight. The average particle diameter was adjusted to be 0.5 μm. Then, 20 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % $Gd_2O_3$-90 mol % $CeO_2$" means that the concentrations of a Gd atom, and a Ce atom are respectively 10 mol % and 90 mol % based on a total amount of the Gd atom and the Ce atom.

(Preparation of Slurry for Reaction Prevention Layer)

The material used for a reaction prevention layer was 10 parts by weight of a powder of the aforementioned cerium-based oxide (LDC40, that is, 40 mol % $La_2O_3$-60 mol % $CeO_2$). The powder was mixed with 0.04 parts by weight of a $Ga_2O_3$ powder as a sintering additive, 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Mote that "40 mol % $La_2O_3$-60 mol % $CeO_2$" means that the concentrations of a La atom and a Ce atom are respectively 40 mol % and 60 mol % based on a total amount of the La atom and the Ce atom.

(Preparation of Slurry A for Solid Electrolyte Layer)

The material used for a solid electrolyte layer was an LSGM powder having a composition of $La_{0.9}Sr_{0.1}Ga_{0.8}Mg_{0.2}O_3$. Then, 40 parts by weight of the LSGM powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a shiny.

(Preparation of Slurry for Air Electrode)

The material used for an air electrode was a powder having a composition of $La_{0.6}Sr_{0.4}Co_{0.2}Fe_{0.8}O_3$. Then, 40 parts by weight of the powder was mixed, with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry.

(Preparation of Solid Oxide Fuel Cell)

Using the green body and the slurries obtained as described above, a solid oxide fuel cell was prepared by the following method.

The green body A for porous support, was extruded to prepare a cylindrical compact. The compact was dried at room temperature, and then heat treated at 1050° C. for 2 hours to prepare a porous support. On the porous support, a fuel electrode layer, a fuel electrode catalyst, layer, a reaction prevention layer, and a solid electrolyte layer were formed in that order by slurry coating. This layered assembly was co-tired at 1300° C. for 2 hours. Next, masking was performed on the cell so that the area of an air electrode may be 17.3 $cm^2$, and the air electrode layer was formed on the surface of the solid electrolyte layer and fired at 1100° C. for 2 hours, it should be noted that the porous support had an outside diameter of 10 mm and a thickness of 1 mm after co-firing. In the prepared solid oxide fuel cell, the fuel electrode layer had a thickness of 100 μm, the fuel electrode catalyst layer had a thickness of 10 μm, the reaction prevention layer had a thickness of 10 μm, the solid electrolyte layer had a thickness of 30 μm, and the air electrode had a thickness of 20 μm. In addition, the outside diameter of the porous support was measured using a micrometer at a portion where no him was formed. Each thickness was obtained by: cutting the cell after a power generation test on the system, observing the cross section with a SEM at any magnification from 30 to 2000, and then dividing by 2 the sum of the maximum value and the minimum value of the thickness. The cutting point was a central portion of the region where the air electrode was formed.

(Power Generation Test)

Using the obtained solid oxide fuel cell power generation test was conducted. Current was collected on the fuel electrode side by pasting and baking a current collecting metal to an exposed portion of the fuel electrode with a silver paste. Current was collected on the air electrode side by applying a silver paste to the surface of the air electrode and then pasting and baking a current collecting metal to an end of the air electrode with the silver paste.

The conditions for power generation were as follows.
Fuel gas: a gas mixture of ($H_2$+3% $H_2O$) and $N_2$ (the mixing ratio was $H_2:N_2$=7:4 (vol:vol))
Fuel utilization: 75%
Oxidant gas: air
Operation temperature: 700° C.
Current density: 0.2 A/$cm^2$ Under these conditions, the power generation test was conducted. The electromotive force: OCV (V) and the initial potential ($V_0$) after 0 hours of the operation as well as the potential ($V_{5000}$) after 5000 hours of the continuous operation were measured. The durability was expressed by a value obtained by dividing the potential after the 5000-hour continuous operation by the initial potential and multiplying the quotient by 100 ($V_{5000}*100/V_0$). Table 1 shows the result.

Example 2

A solid oxide fuel cell was prepared in the same manner as in Example 1, except that the CaO content was 0.05 mass %, and the power generation test was conducted. Table 1 shows the result.

Example 3

A solid oxide fuel cell was prepared in the same manner as in Example 1, except that the CaO content was 0.1 mass %, and the power generation test was conducted. Table 1 shows the result.

Comparative Example 1

A solid oxide fuel cell was prepared in the same manner as in Example 1, except that the CaO content was 0.26 mass %, and the power generation test was conducted. Table 1 shows the result.

TABLE 1

|  | CaO Content (mass %) | State of Solid Electrolyte Layer | Electromotive Force (V) | Durability |
|---|---|---|---|---|
| Example 1 | 0.02 | Excellent | 1.05 | 98.5 |
| Example 2 | 0.05 | Excellent | 1.05 | 98.2 |
| Example 3 | 0.1 | Good | 0.97 | 98.0 |
| Comparative | 0.26 | Poor | 0.68 | unevaluated |

State of Solid Electrolyte Layer:

The fractured surface of the solid oxide fuel cell was observed using a scanning electron microscope (S-4100 manufactured by Hitachi, Ltd.) at an accelerating voltage of 15 kV with secondary electron images at magnifications from 100 to 10000 to evaluate the shape of the structure of the solid electrolyte layer.

Moreover, after the cut surface of the solid oxide fuel, cell was polished, the surface was subjected to elemental analysis using EPMA (Shimadzu electron probe microanalyzer EPMA-8705 manufactured by Shimadzu Corporation), and observed to judge whether or not the structural elements of the solid electrolyte layer were uniformly distributed.

A "Excellent" Indicates that the solid electrolyte was made of dense LSGM crystals.

A "Good" indicates that the solid electrolyte was made of LSGM crystals, hut the diffusion of Sr was observed.

A "Poor" indicates that Sr diffused, so that no LSGM crystal was formed. In Examples 1 to 3 in which the porous support had a CaO content of 0.2 mass % or less, sufficient initial potential and durability were demonstrated.

(Cross-Sectional Observation of Solid Oxide Fuel Cell)

Figure 7:
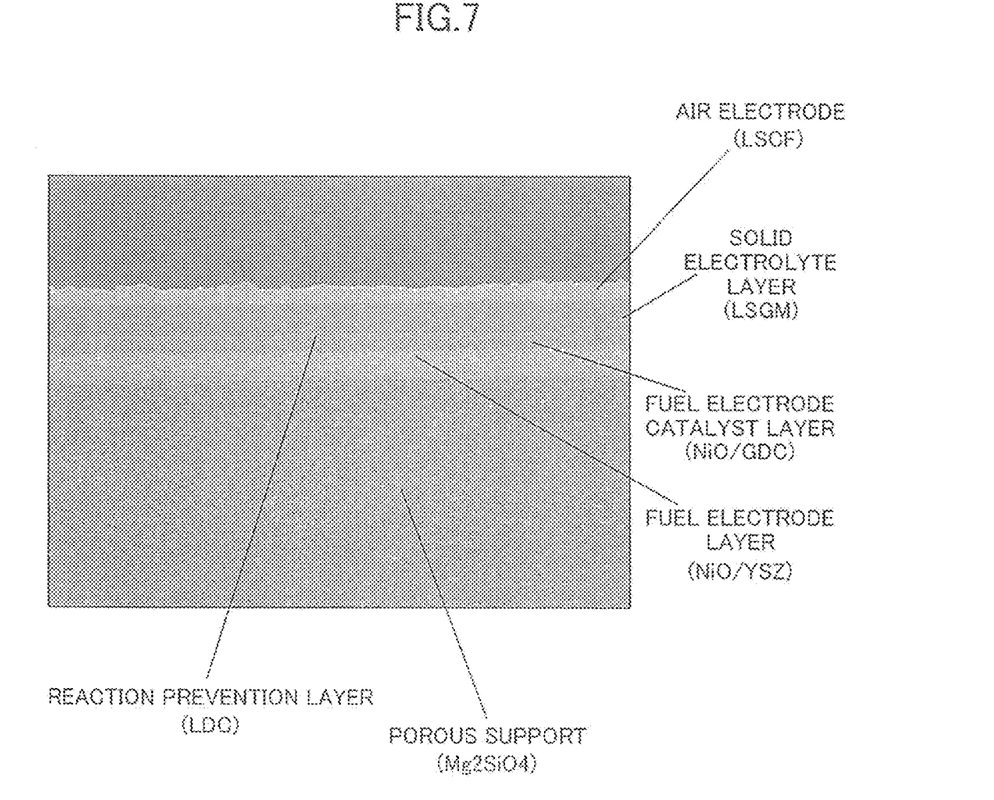
FIG. 7 is a SEM cross section of a solid oxide fuel cell obtained in Example 1.
Figure 8:
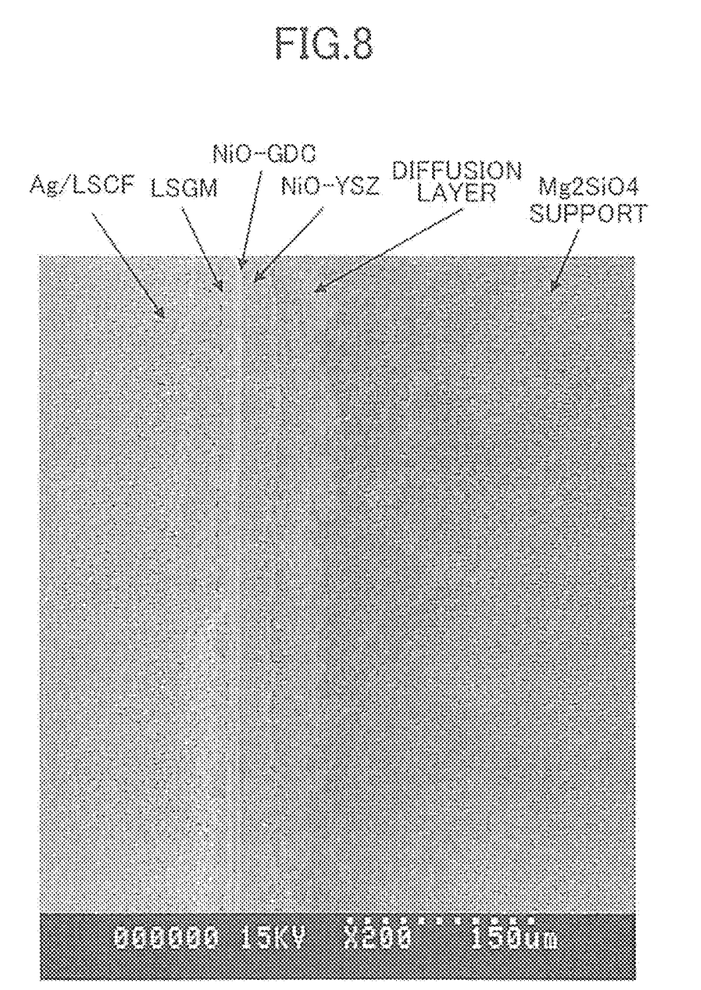
FIG. 8 is a SEM cross section of a solid oxide fuel cell obtained in Comparative Example 1.

The cross sections of the solid oxide fuel cells obtained in Example 1 and Comparative Example 1 were observed with a SEM (shown respectively in FIGS. 7 and 8). It can be seen in FIG. 7 that the fuel electrode layer, the fuel, electrode catalyst layer, the reaction prevention layer, and the solid electrolyte layer were formed in the solid oxide fuel cell, of the present invention. On the other hand, it can be seen in FIG. 8 that: a diffusion layer containing Ca was formed between the porous support and the fuel electrode layer; and regarding the fuel electrode layer, the fuel electrode catalyst layer, the reaction prevention layer, and the solid electrolyte layer, these layers were disturbed in comparison with the solid oxide fuel cell of the present invention in FIG. 7. Further, it was found out that the solid electrolyte layer was a rough LaGaO layer but not an LSGM layer, and hence did not function as a solid electrolyte. Additionally, the result of the elemental analysis (EDX analysis) revealed that the diffusion layer contained Ca, Sr, La, Ga, Zr, Si, Mg, and Gd.

Example 4

Preparation of Green Body B for Porous Support

A forsterite ($Mg_2SiO_4$ raw material containing 0.5 mass % CaO) powder was adjusted to have an average particle diameter of 0.7 μm. After 100 parts by weight of the powder was mixed with 20 parts by weight of a solvent (water), 8 parts by weight, of a binder (methyl cellulose), 0.5 parts by weight of a lubricant (fatty acid ester), and 15 parts by weight of a pore forming agent (acrylic resin particles having an average particle diameter of 5 μm) using a high-speed mixer, the mixture was kneaded with a kneader and deaerated with a vacuum kneader. Thus, a green body for extrusion was prepared.

(Preparation of Slurry for Porous Support)

A high purity forsterite ($Mg_2SiO_4$ raw material containing 0.02 mass % CaO) powder was adjusted to have an average particle diameter of 0.7 μm. Then, 20 parts by weight of the powder, 100 parts by weight of a solvent (ethanol), 2 parts by weight of a binder (ethyl cellulose), and 1 part by weight of a dispersant (nonionic surfactant) were fully stirred with a ball mill to prepare a slurry.

(Preparation of Solid Oxide Fuel Cell)

Using the green body B for porous support and the slurry for porous support obtained as described above as well as the slurries obtained in Example 1, a solid oxide fuel cell was prepared by the following method.

The green body B for porous support was extruded to prepare a cylindrical compact. The compact was dried at room temperature, and then heat treated at 1050° C. for 2 hours. Next, a high purity forsterite layer was formed by slurry coating, and heat treated at 1050° C. for 2 hours to prepare a porous support. Further, a fuel electrode layer, a fuel electrode catalyst layer, a reaction prevention layer, and a solid electrolyte layer were formed in that order by slurry coating. This layered assembly was co-fired at 1300° C. for 2 hours. Next, masking was performed on the cell so that the area of an air electrode may be 17.3 cm², and the air electrode layer was formed on the surface of the solid electrolyte layer and fired at 1100° C. for 2 hours. It should be noted that the porous support had an outside diameter of 10 mm and a thickness of 1 mm after co-firing, and the high purity forsterite layer had a thickness of 50 μm. In the prepared solid oxide fuel cell, the fuel electrode layer had a thickness of 100 μm, the fuel electrode catalyst layer had a thickness of 10 μm, the reaction prevention layer had a thickness of 10 μm, the solid electrolyte layer had a thickness of 30 μm, and the air electrode had a thickness of 20 μm.

The power generation test was conducted on the obtained solid oxide fuel cell in the same manner as in Example 1. Table 2 shows the result.

Example 5

A solid oxide fuel cell was prepared in the same manner as in Example 4, except that 15 parts by weight of a pore forming agent (acrylic resin particles having an average particle diameter of 5 μm) was added to the slurry for high purity forsterite layer, and the power generation test was conducted. Table 2 shows the result.

Example 6

A solid oxide fuel cell was prepared in the same manner as in Example 5, except, that the high purity forsterite layer had a thickness of 130 μm, and the power generation test was conducted. Table 2 shows the result.

Example 7

A solid oxide fuel cell was prepared in the same manner as in Example 6, except that the fuel electrode layer had a thickness of 150 μm, and the power generation test was conducted. Table 2 shows the result.

TABLE 2

| | State of Solid Electrolyte Layer | Electromotive Force (V) | Durability |
|---|---|---|---|
| Example 4 | Good | 1.02 | 97.8 |
| Example 5 | Good | 1.02 | 98.1 |
| Example 6 | Excellent | 1.05 | 98.6 |
| Example 7 | Excellent | 1.05 | 98.7 |
| Comparative Example 1 | Poor | 0.68 | unevaluated |

State of Solid Electrolyte Layer; evaluated in the same manner as in Examples 1 to 3.

It was found out that when the amount of Ca was small in at least the surface of the porous support, electrical power was sufficiently generated.

Example 8

Preparation of Slurry B for Solid Electrolyte Layer

The material used for a solid electrolyte layer was a 10YSZ (10 mol % $Y_2O_3$-90 mol % $ZrO_2$) powder. Then, 40 parts by weight of the 10YSZ powder was mixed with 100 parts by weight of a solvent (ethanol), 2 parts by weight of a hinder (ethyl cellulose), and 1 part by weight of a dispersant (nonionic surfactant). After that, the resultant mixture was fully stirred to prepare a slurry. Note that "10 mol % $Y_2O_3$-90 mol % $ZrO_2$" means that the concentrations of a Y atom and a Zr atom are respectively 10 mol % and 90 mol % based on a total amount of the Y atom and the Zr atom.
(Preparation of Slurry for Second Solid Electrolyte Layer)

The material used for a second solid electrolyte layer was the aforementioned GDC 10 (10 mol % $Gd_2O_3$-90 mol % $CeO_2$) powder. Then, 10 parts by weight of the GDC 10 powder was mixed with 100 parts by weight of a solvent (ethanol), 2 parts by weight of a hinder (ethyl cellulose), and 1 part by weight of a dispersant (nonionic surfactant). After that, the resultant mixture was fully stirred to prepare a slurry. Mote that "10 mol % $Gd_2O_3$-90 mol % $CeO_2$" means that the concentrations of a Gd atom and a Ce atom are respectively 10 mol % and 90 mol % based on a total amount of the Gd atom and the Ce atom.
(Preparation of Solid Oxide Fuel Cell)

Using the green body B for porous support, the slurry for porous support, the slurry for fuel, electrode layer, the slurry for fuel electrode catalyst layer, the slurry B for solid electrolyte layer, the slurry for second solid electrolyte layer, and the slurry for air electrode, a solid oxide fuel cell was prepared by the following method.

The green body B for porous support was extruded to prepare a cylindrical compact. The compact was dried at room, temperature, and then heat treated at 1050° C. for 2 hours. Next, using the slurry for porous support, a high purity forsterite layer was formed by slurry coating, and heat treated at 1050° C. for 2 hours to prepare a porous support, further, a fuel electrode layer, a fuel electrode catalyst layer, a solid electrolyte layer, and a second solid electrolyte layer were formed in that order by slurry coating. This layered assembly was co-fired at 1300° C. for 2 hours. Next, masking was performed on the cell so that the area of an air electrode may be 17.3 cm², and the air electrode layer was formed on the surface of the second solid electrolyte layer and fired at 1100° C. for 2 hours. It should be noted that the porous support had an outside diameter of 10 mm and a thickness of 1 mm after co-firing, and the high purity forsterite layer had a thickness of 50 μm. In the prepared solid oxide fuel cell the fuel electrode layer had a thickness of 100 μm, the fuel electrode catalyst layer had a thickness of 10 μm, the solid electrolyte layer had a thickness of 30 μm, the second solid electrolyte layer had a thickness of 5 μm, and the air electrode had a thickness of 20 μm. In addition, the outside diameter of the porous support was measured using a micrometer at a portion where no film was formed. Each thickness was obtained by: cutting the cell after a power generation test on the system, observing the cross section with a SEM at any magnification from 30 to 2000, and then dividing by 2 the sum of the maximum value and the minimum value of the thickness. The cutting point was a central portion of the region where the air electrode was formed. The power generation test was conducted on the obtained solid oxide fuel cell in the same manner as in Example 1. Table 3 shows the result.

TABLE 3

| | State of Solid Electrolyte Layer | Electromotive Force (V) | Durability |
|---|---|---|---|
| Example 8 | Excellent | 1.10 | 97.0 |

Comparative Example 2

Preparation of Green Body C for Porous Support

A forsterite ($Mg_2SiO_4$ raw material containing 2.6 mass % CaO) powder was adjusted to have an average particle diameter of 1.3 μm. After 100 parts by weight of the powder was mixed with 20 parts by weight of a solvent (water), 7 parts by weight of a binder (methyl cellulose), 0.4 parts by weight of a lubricant (fatty acid ester), and 10 parts by weight of a pore forming agent (acrylic-resin particles having an average particle diameter of 5 μm) using a high-speed mixer, the mixture was kneaded with, a kneader and deaerated with a vacuum kneader. Thus, a green body for extrusion was prepared. Here, the average particle diameter was measured according to JIS R 1629, and expressed in a 50% diameter.
(Preparation of Solid Oxide Fuel Cell)

Using the green body C for porous support obtained as described above, the slurry for fuel electrode layer, the slurry for fuel electrode catalyst layer, the slurry B for solid electrolyte layer, the slurry for second solid electrolyte layer, and the slurry for air electrode, a solid oxide fuel cell was prepared by the following method.

The green body C for porous support was extruded to prepare a cylindrical compact. The compact was dried at room temperature, and then heat treated at 1100° C. for 2 hours to prepare a porous support. On the porous support, a fuel electrode layer, a fuel electrode catalyst layer, a solid electrolyte layer, and a second solid electrolyte layer were formed in that order by slurry coating. This layered assembly was co-fired at 1300° C. for 2 hours. Next, masking was performed on the cell so that the area of an air electrode may be 173 cm², and the air electrode layer was formed on the surface of the second solid electrolyte layer and fired at 1100° C. for 2 hours, it should be noted that the porous support had an outside diameter of 10 mm and a thickness of 1 mm after co-firing. In the prepared solid oxide fuel cell, the fuel electrode layer had a thickness of 100 μm, the fuel electrode catalyst layer had a thickness of 10 μm, the solid electrolyte layer had a thickness of 30 μm, the second, solid electrolyte layer had a thickness of 5 μm, and the air electrode had a thickness of 20 μm. In addition, the outside diameter of the porous support was measured using a micrometer at a portion where no film was formed. Each thickness was obtained by: cutting the cell after a power generation test on the system, observing the cross section with a SEM at any magnification from 30 to 2000, and then dividing by 2 the sum of the maximum value and the minimum value of the thickness. The cutting point was a central portion of the region where the air electrode was formed. The power generation test was conducted on the obtained solid oxide fuel cell in the same manner as in Example 1. Table 4 shows the result.

TABLE 4

| | CaO Content (mass %) | State of Solid Electrolyte Layer | Electromotive Force (V) | Durability |
|---|---|---|---|---|
| Comparative Example 2 | 2.6 | Poor | 0.65 | unevaluated |

State of Solid Electrolyte Layer:

The fractured surface of the solid oxide fuel cell was observed using a scanning electron microscope (S-4100 manufactured by Hitachi, Ltd.) at an accelerating voltage of 15 kV with secondary electron images at magnifications from 100 to 10000 to evaluate the shape of the structure of the solid electrolyte layer.

Moreover, after the cut surface of the solid oxide fuel cell was polished, the surface was subjected to elemental analysis using EPMA (Shimadzu electron probe microanalyzer EPMA-8705 manufactured by Shimadzu Corporation), and observed to judge whether or not the structural elements of the solid electrolyte layer were uniformly distributed.

A "Excellent" indicates that the solid electrolyte was made of dense 10YSZ crystals, and apparently no formation of an interlay er was found between the porous support and the fuel electrode.

A "Good" indicates that the solid electrolyte was made of 10YSZ crystals, hut an interlayer was observed.

A "Poor" indicates that Ca diffused, so that the 10YSZ crystal phase was not dense. In Example 8 in which the porous support had a CaO content of 2 mass % or less, sufficient initial potential and durability were demonstrated.

(Cross-Sectional Observation of Solid Oxide Fuel Cell)

Figure 9:
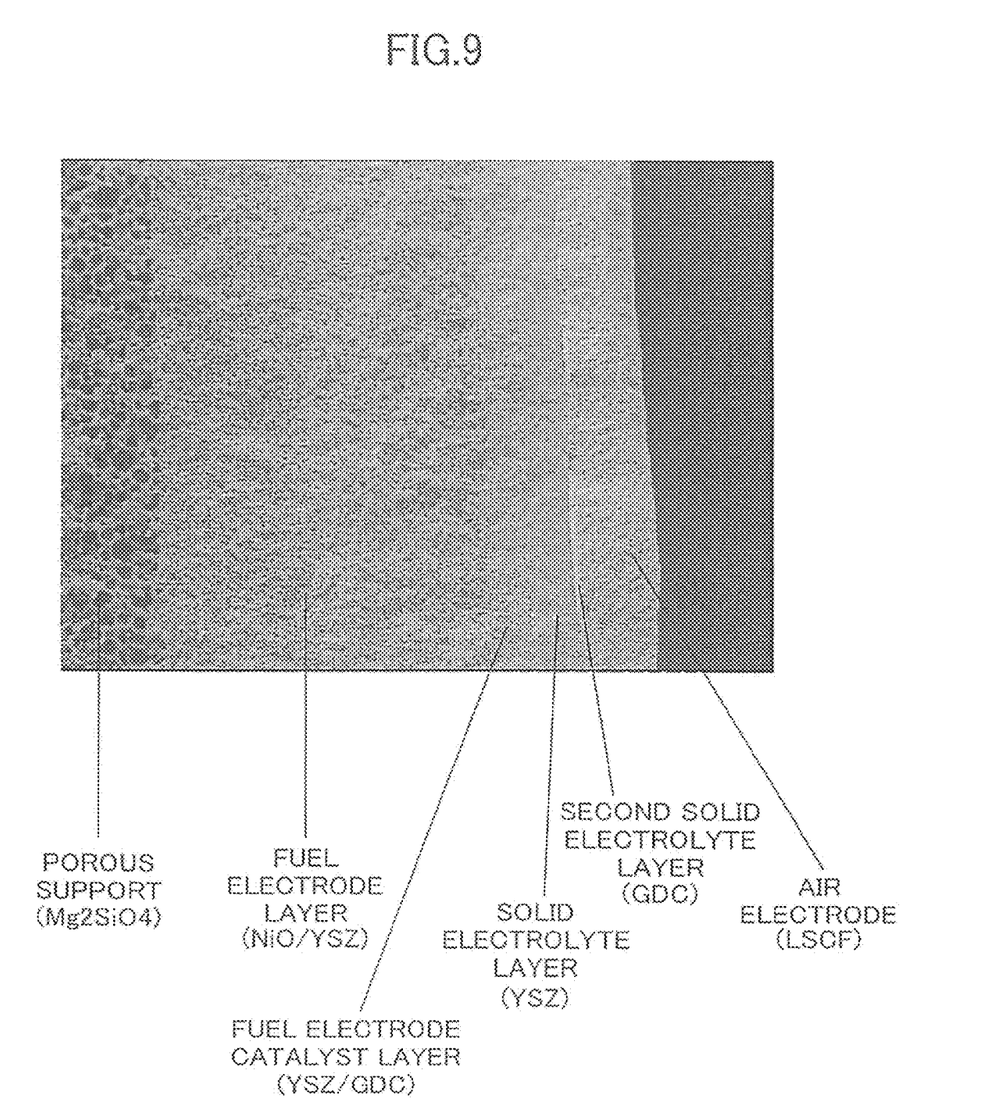
FIG. 9 is a SEM cross section of a solid oxide fuel cell obtained in Example 8.

The cross section of the solid oxide fuel cell obtained in Example 8 was observed with, a SEM. In FIG. 9, the porous support, the fuel electrode layer, the fuel, electrode catalyst layer, the solid electrolyte layer, the second solid electrolyte layer, and the air electrode layer can be seen.

What is claimed is:

1. A solid oxide fuel cell comprising an inner electrode, a solid electrolyte, and an outer electrode, each being sequentially laminated on a surface of a porous support, wherein
the porous support comprises forsterite, and has a Ca element content of 0.2 mass % or less in terms of CaO in a surface region that covers a depth of approximately 100 μm from the surface at the inner electrode side.

2. The solid oxide fuel cell according to claim 1, wherein the solid electrolyte comprises lanthanum-gallate-based oxide doped with Sr and Mg.

3. The solid oxide fuel cell according to claim 2, wherein the solid electrolyte is represented by the general formula $La_{1-a}Sr_aGa_{1-b-c}Mg_bCo_cO_3$, wherein $0.05 \leq a \leq 0.3$, $0 < b < 0.3$, and $0 \leq c \leq 0.15$.

4. The solid oxide fuel cell according to claim 1, wherein the porous support has a Ca element content of 0.2 mass % or less in terms of CaO.

5. The solid oxide fuel cell according to claim 1, wherein the porous support comprises a laminate including at least two layers, each having different Ca element contents.

6. The solid oxide fuel cell according to claim 5, wherein the porous support comprises a layer at the inner electrode side, the layer having a Ca element content of 0.2 mass % or less in terms of CaO.

7. A method for producing a solid oxide fuel cell comprising an inner electrode, a solid electrolyte, and an outer electrode, each being sequentially laminated on a surface of a porous support, the method comprising forming the porous support by firing a compact having a Ca element content of 0.2 mass % or less in terms of CaO and further including forsterite, and sequentially forming the inner electrode, the solid electrolyte, and the outer electrode on the surface of the porous support.

8. The production method according to claim 7, wherein the compact comprises at least two layers, each having different Ca element contents, and one of the layers at the inner electrode side, has a Ca element content of 0.2 mass % or less in terms of CaO.

9. The solid oxide fuel cell according to claim 2, wherein the porous support comprises a laminate including at least two layers, each having different Ca element contents.

10. The solid oxide fuel cell according to claim 9, wherein the porous support comprises a layer at the inner electrode side, the layer having a Ca element content of 0.2 mass % or less in terms of CaO.

11. The solid oxide fuel cell according to claim 3, wherein the porous support comprises a laminate including at least two layers, each having different Ca element contents.

12. The solid oxide fuel cell according to claim 11, wherein the porous support comprises a layer at the inner electrode side, the layer having a Ca element content of 0.2 mass % or less in terms of CaO.

* * * * *